United States Patent
Fenocchi et al.

(12) 
(10) Patent No.: US 6,203,257 B1
(45) Date of Patent: Mar. 20, 2001

(54) METHOD OF FORMING A DRIVE SURFACE ON AN ECCENTRIC PIN

(75) Inventors: David M. Fenocchi; Edward A. Tomayko; Richard C. Vaught, all of Arkadelphia, AR (US)

(73) Assignee: Scroll Technologies, Arkadelphia, AR (US)

( * ) Notice: Subject to any disclaimer, the term of this patent is extended or adjusted under 35 U.S.C. 154(b) by 0 days.

(21) Appl. No.: 09/406,179

(22) Filed: Sep. 24, 1999

(51) Int. Cl.$^7$ ................................................ B23D 37/00
(52) U.S. Cl. ........................................................... 409/244
(58) Field of Search ..................................... 409/244, 243, 409/293, 131; 29/888.02, 888.022, 436; 417/221; 418/55.1

(56) References Cited

U.S. PATENT DOCUMENTS

| | | | |
|---|---|---|---|
| 2,511,912 | * 6/1950 | George | 409/244 X |
| 3,825,992 | * 7/1974 | Troeger | 29/436 |
| 4,108,577 | * 8/1978 | Brucken et al. | 417/221 |

* cited by examiner

*Primary Examiner*—William Briggs
(74) *Attorney, Agent, or Firm*—Carlson, Gaskey & Olds

(57) ABSTRACT

A method of forming a drive surface on an eccentric pin of a drive shaft for a scroll-type compressor is provided. First, an eccentric pin having an axis and a generally cylindrical outer surface disposed radially about the axis is provided. Next, a broaching tool having a machining face with a contour is provided. The contour may be a concave shallow bell-shaped curve. Finally, the drive surface is formed by engaging the outer surface with the machining face transverse to the axis. In this manner, the machining face forms a shape complementary to the contour on the eccentric pin thereby forming a slight crown on the drive surface. The broaching tool produces an adequate surface finish so that no subsequent machining operations to the drive surface are necessary.

6 Claims, 1 Drawing Sheet

METHOD OF FORMING A DRIVE SURFACE ON AN ECCENTRIC PIN

BACKGROUND OF THE INVENTION

This invention relates to an eccentric pin on a scroll compressor drive shaft, and more specifically, to a method of forming a drive surface on the eccentric pin.

Scroll compressors utilize drive shafts that have an end with an eccentric pin, which is displaced from the rotational axis of the drive shaft. The eccentric pin is received within a bore in a slider block which is, in turn, received within a portion of an orbiting scroll, as is well know in the art. During rotation of the drive shaft, the eccentric pin engages the slider block and moves the orbiting scroll through an orbital path.

The eccentric pin has a generally cylindrical outer surface with a drive surface formed along the length of a portion of the outer surface. The drive surface is generally flat with a slight crown in the middle for providing single line contact with the slider block. The drive surface must have a relatively smooth surface finish to minimize the friction between the eccentric pin and the slider block. Previously, to form the drive surface the drive shaft had to be moved to a first machining operation where a flat was broached onto the eccentric pin. Next, the drive shaft had to be moved to a second machining operation where the crown was then formed on the flat by a finish grinding operation, which also provided the desired surface finish. Forming a drive surface with a crown in two separate operations resulted in increased labor and tooling costs. Therefore, what is needed is a more efficient method of forming a finished drive surface with a crown.

SUMMARY OF THE INVENTION AND ADVANTAGES

The present invention provides a method of forming a drive surface on an eccentric pin of a drive shaft for a scroll-type compressor. First, an eccentric pin having an axis and a generally cylindrical outer surface disposed radially about the axis is provided. Next, a broaching tool having a machining face with a contour is provided. The contour may be a concave shallow bell-shaped curve. Finally, the drive surface is formed by engaging the outer surface with the machining face transverse to the axis. In this manner, the machining face forms a shape complementary to the contour on the eccentric pin thereby forming a slight crown on the drive surface. The broaching tool produces an adequate surface finish so that no subsequent machining operations to the drive surface are necessary.

Accordingly, the above provides a more efficient method of forming a finished drive surface with a crown.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
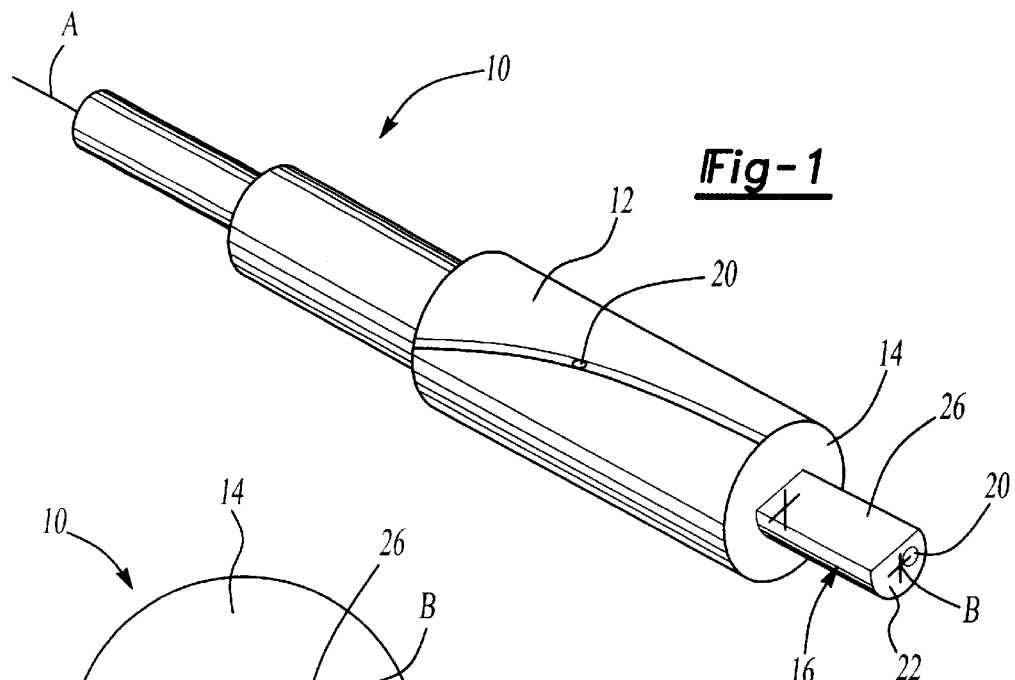
FIG. 1 is a perspective view of a scroll compressor drive shaft having an eccentric pin with a finished drive surface formed using the present invention.
Figure 2:
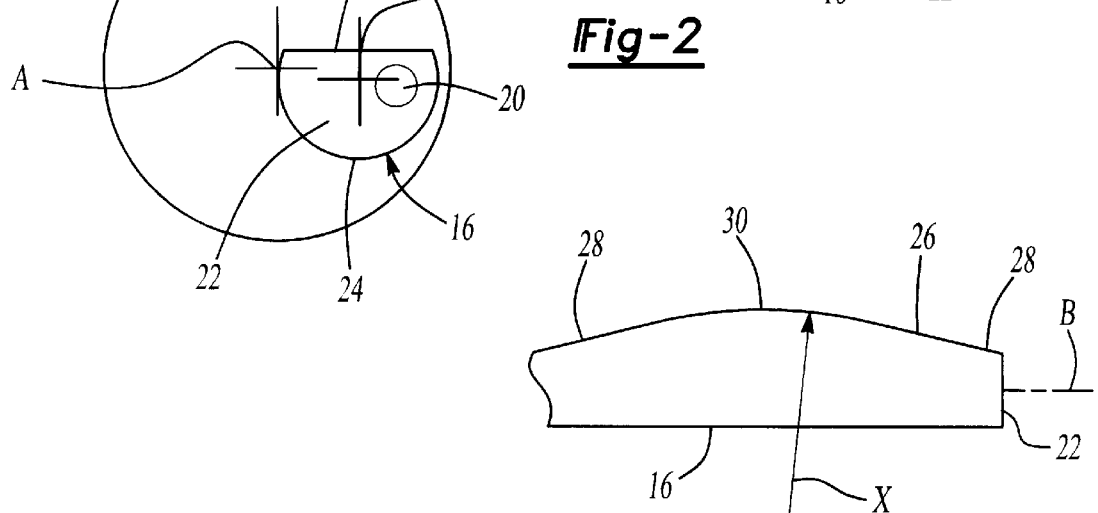
FIG. 2 is an end view of the shaft and pin shown in FIG. 1.

A drive shaft 10 for a scroll-type compressor is shown in FIGS. 1 and 2. The drive shaft 10, which has a rotational axis A, includes a bearing 12 and an end 14 adjacent to the bearing 12. An eccentric pin 16 extends axially from the end 14. The eccentric pin 16 is received within a bore in a slider block which, in turn, is received within a portion of an orbiting scroll, as is well know in the art. The drive shaft 10 has lubrication passageways 20 that distribute lubricating fluid to portions of the drive shaft 10 that frictionally engage other components of the scroll compressor. For example, the lubrication passageways 20 carry lubricating fluid to the bearing 12 and to a terminal end 22 of the eccentric pin 16.

Figure 3:
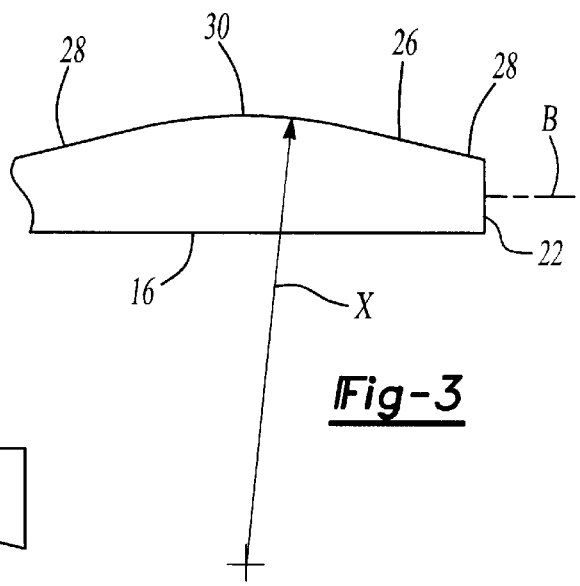
FIG. 3 is an exaggerated side view of the eccentric pin shown in FIG. 1.
Figure 4:
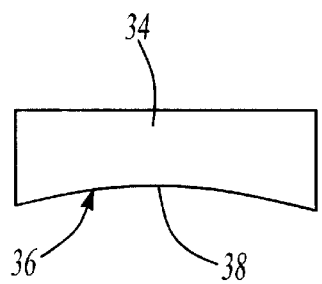
FIG. 4 is an exaggerated end view of a broaching tool used to form the finished drive surface shown in FIG. 3.

The eccentric pin 16 has an axis B, which is spaced apart from axis A, with a generally cylindrical outer surface 24 disposed radially about the axis B. The outer surface 24 has a drive surface 26 that engages a feature of the slider block within the slider block bore. The drive surface 26 has a slight crown, which is best shown in FIG. 3, which provides single line contact between the eccentric pin 16 and the slider block. The drive surface 26 forms a flat when viewed from the end 22. Low features 28 on both ends of the eccentric pin 16 and a high feature 30 between the low features 28 define the crowned drive surface 26. The low 28 and high 30 features are defined by a radius, which is depicted by x in FIG. 3. The high feature 30 is raised approximately 0.195 mm from the low feature 28. Of course, the crowned drive surface 26 may be defined in a different manner. Further, the difference between the low 28 and high 30 feature may be greater or less than the distance disclosed.

Typically, the drive shaft 10, including the eccentric pin 16, is rough turned from 1045 steel bar stock. It is to be understood that drive shaft 10 may be formed from different material and that it need not start from bar stock. According to the present invention, a finished drive surface 26 is formed by providing a broaching tool 34 having a machining face 36 with a contour 38, as is known in the art. The contour 38 has a concave shallow bell-shaped curve that is complementary to the desired shape of the finished drive surface 26. The finished drive surface 16 is machined by engaging the outer surface 24 of the eccentric pin 16 with the machining face 36 transverse to the axis B. In this manner, the contour 38 is transferred to the eccentric pin 16. The surface finish obtained by the broaching operation is adequate so that no further machining of the drive surface is required.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A method of forming a finished drive surface on an eccentric pin of a drive shaft for a scroll compressor, the method comprising:

a) providing the eccentric pin having an axis and a generally cylindrical outer surface disposed radially about the axis;

b) providing a broaching tool having a machining face with a contour;

c) engaging the outer surface with the machining face transverse to the axis to form a shape complementary to the contour that defines the finished drive surface.

2. The method as set forth in claim 1 wherein the contour is a concave shallow bell-shaped curve.

3. The method as set forth in claim 2 wherein the finished drive surface has a slight crown with a low feature and a high feature defined by a radius, the finished drive surface spaced a radial distance from the axis with the radial distance of the high feature being approximately 0.145 mm larger than the radial distance of the low feature.

4. The method as set forth in claim 3 wherein the eccentric pin has an end with the finished drive surface forming a flat on the cylindrical surface when viewed from the end.

5. The method as set forth in claim 1 wherein step a) is preceded by the step of d) rough turning the drive shaft to form the generally cylindrical outer surface.

6. The method as set forth in claim 5 wherein the drive shaft comprises 1045 steel.

* * * * *